Sept. 24, 1940.   H. R. SCHUTZ   2,215,981
APPARATUS FOR BANDING ARTICLES
Filed Feb. 2, 1937   2 Sheets-Sheet 2
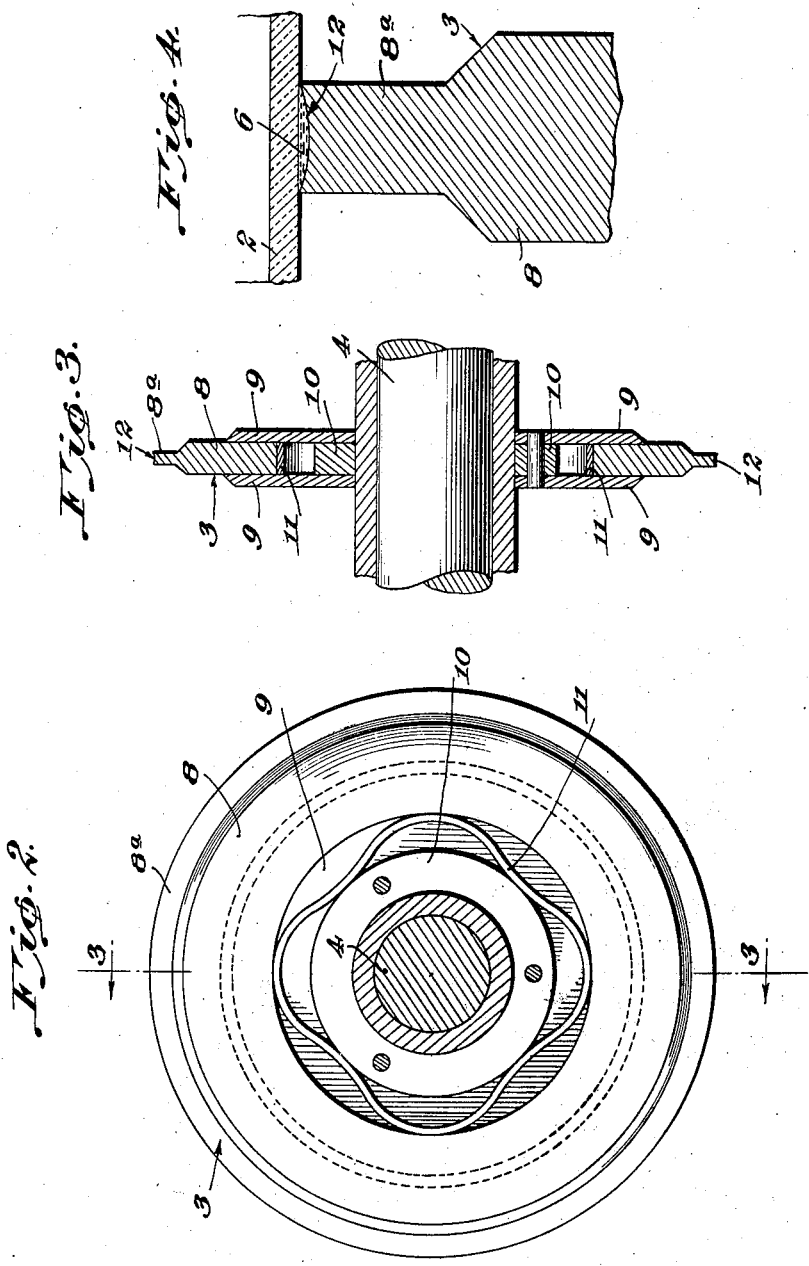
INVENTOR
Harold R. Schutz,
BY
ATTORNEYS Patented Sept. 24, 1940

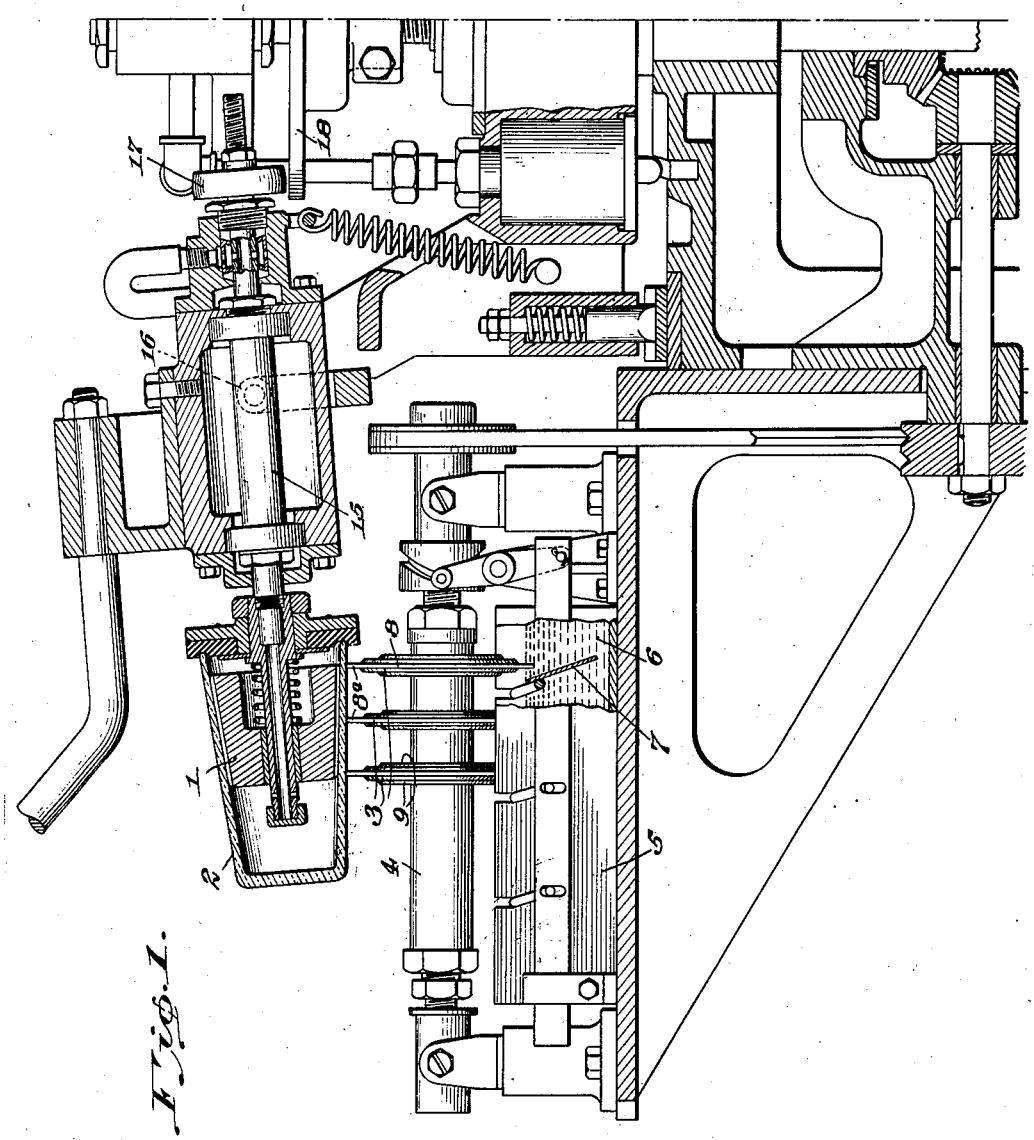

2,215,981

UNITED STATES PATENT OFFICE 2,215,981

APPARATUS FOR BANDING ARTICLES

Harold R. Schutz, Toledo, Ohio, assignor to Libbey Glass Company, a corporation of Ohio Application February 2, 1937, Serial No. 123,701

1 Claim. (Cl. 91—12)

The present invention relates to improvements in apparatus for banding or decorating articles.

The main object of the invention herein described is to provide an apparatus that will effectively and efficiently apply bands or decoration of any desired colors to the surface of an article of glassware, ceramic ware, metal or any other material which will provide a surface conducive to the fusing of decorating material thereon.

Another object is to provide a color applying disk of a particular shape, whereby the color, enamel or other decorating material is transferred to the article to be decorated in such a manner as will result in a sharply defined band or decoration of desired dimension and opacity.

A still further object is to provide a banding apparatus by means of which the decorating material applied to the article will maintain its applied form without the formation of a blob or lump in the decoration as the operation is completed.

This application is a continuation-in-part of my copending application Serial Number 109,537, filed November 6, 1936, for a Method and apparatus for banding articles.

Other objects will be in part apparent and in part pointed out hereinafter.

In the drawings:

Fig. 1 is a vertical sectional elevation illustrating one manner of supporting an article in contact with the material applying members;

Fig. 2 is a part sectional elevation of one of the material applying disk assemblies;

Fig. 3 is a vertical sectional elevation through one of the disk members taken at line 3—3 of Fig. 2; and Fig. 4 is a part sectional elevation taken through the outer peripheral portion of a disk showing the concave shape given to the face for the proper application of decorating material.

In detail, 1 is a chuck of the vacuum type on which is held a tumbler 2. Enamel applying disks 3 are mounted on a rotatable shaft 4 and extend into a material reservoir 5 so as to pass through the coloring matter 6. Agitators 7 oscillate in the decorating material to keep it thoroughly stirred.

Each enamel applying disk 3 comprises a steel ring 8 or disk shaped at its outer edge to form an enamel applying portion 8a, the outer peripheral surface of which has a width corresponding approximately to the width of the band to be applied to the tumbler. The ring 8 is held frictionally between a pair of disks 9 that are secured to a hub 10. Positioned between the hub 10 and the ring 8 is a curved band spring member 11. This construction permits the ring member 8 to yield vertically so as to compensate for any irregularities on the surface of the tumbler and for any unequal wear of the edge of the disk, and permits the disks to align themselves to the surface of the periphery of the tumbler.

The outer peripheral edge of the ring 8 is provided with a shallow groove 12 (Fig. 4) the outer edges 13 of which terminate sharply. These edges 13 contact the surface of the tumbler and confine the enamel therebetween on the surface undergoing decoration so that the resultant band is sharply defined. Upon rotation of the disk 3 a thin film of enamel adheres to the periphery of the ring 8 throughout the entire surface region of the groove 12 by virtue of molecular adhesion between the enamel particles and the disk. Ordinarily where the speed of rotation of the disk is sufficiently slow that the action of centrifugal force is negligible, this film of enamel would have a degree of concavity substantially equal to the degree of concavity of the groove 12. However, upon rotation of the disk 3 in the manner set forth hereinafter, the action of centrifugal force upon the film of enamel causes the degree of concavity thereof to become materially lessened and the medial regions of the film are thrown outwardly of the disk and assume a state of equilibrium just within the confines of the groove 12. Thus, the coloring material will contact the surface of the article being banded first at the outer edges of the film and will be drawn flat against the surface of the article in the medial regions of the film because the surface tension of the film overcomes the equilibrium existing between the centrifugal and centripetal forces acting on the enamel.

The thickness of the band of enamel applied to the glass is determined or controlled by the depth of the concave edge of the applying disk. The greater the depth, the greater the thickness of the band. In practice, the radius of curvature of the concave portion is about four times the thickness of the enamel-applying edge 8a of the ring member 8. For example, if the thickness of the enamel-applying edge is one-sixteenth of an inch, the radius of curvature of the concave portion will be one-fourth of an inch.

The ring members 8 being frictionally connected to the shaft 4 are driven at a predetermined speed, said speed being in proportion and relation to the diameter of the disks and of a type that will lift the proper amount of enamel to the point of application to the article being decorated without distorting the shape of the band or causing the ring 8 to lose control of the material through the action of centrifugal force.

After the application of the band to the article, the ring 8 and the article are moved away from each other and during this movement there is created a tail of enamel or decorating material which will cause a blob or lump in the band unless steps are taken to obviate this condition.

Therefore, as the ring and article separate, the article is rotated at a rather high rate of speed (compared with the normal rate) which causes the tail to rapidly and almost instantaneously string out into a fine thread to be absorbed into the applied band without any detrimental results. The increase in speed of rotation of the article as it leaves the banding ring 8 is absolutely essential to the elimination of the possibility of a lump in the band.

Toward this end, the chuck 1 is mounted at the forward end of a shaft 15 which is carried by the chuck assembly. The entire chuck assembly is pivoted as at 16 for tilting movement about a horizontal axis in such a manner that as the chuck and tumbler are elevated from tractional contact with the banding rings 8, the rear end of the assembly is lowered. Upon tilting of the chuck assembly in the manner just described, a friction wheel 17 mounted on the rear end of the shaft 15 engages a friction disk 18 which rotates continuously at a comparatively high rate of speed and thus the shaft 15 and tumbler 2 thereon are accelerated.

In order that the band of decorating material applied to the tumbler may have sharply defined marginal edges and dry in the desired form and thickness, it is preferable to heat the tumblers that are to be decorated before subjecting them to the enamel applying operation.

After the application of the decorating material to the article, said article is processed through an annealing leer where the temperature conditions may be such as to bring the decorating material and the article to like temperatures, whereby a fusing action takes place, causing the decorating material to be bonded or fused in place on the surface of the article.

Modifications may be resorted to within the spirit and scope of the appended claim.

I claim:

In an apparatus for banding the curved surfaces of articles such as tumblers and the like, a rotatable shaft, a banding disk mounted on the shaft for rotation therewith, said banding disk having a concave periphery providing two sharp outer edges, the radius of curvature of the concave portion being about four times the thickness of the outer edge of the disk, and means for rotating the shaft.

HAROLD R. SCHUTZ.